US012741410B2

(12) United States Patent
Novorolsky et al.

(10) Patent No.: US 12,741,410 B2
(45) Date of Patent: Sep. 22, 2026

(54) GAS SHIELD GENERATOR FOR A BLOW/FILL/SEAL MACHINE

(71) Applicant: Weiler Engineering Inc., Elgin, IL (US)

(72) Inventors: Paul Novorolsky, DeKalb, IL (US); Alex A. Bazdor, Woodstock, IL (US)

(73) Assignee: WEILER ENGINEERING, INC., Elgin, IL (US)

( * ) Notice: Subject to any disclaimer, the term of this patent is extended or adjusted under 35 U.S.C. 154(b) by 243 days.

(21) Appl. No.: 18/543,725

(22) Filed: Dec. 18, 2023

(65) Prior Publication Data

US 2024/0375339 A1 Nov. 14, 2024

Related U.S. Application Data

(63) Continuation-in-part of application No. 18/195,183, filed on May 9, 2023, now Pat. No. 12,186,964.

(51) Int. Cl.
*B29C 49/04* (2006.01)
*B29C 49/48* (2006.01)

(52) U.S. Cl.
CPC .... *B29C 49/04106* (2022.05); *B29C 49/4817* (2013.01)

(58) Field of Classification Search
CPC ...................... B29C 49/4817; B29C 49/04106
See application file for complete search history.

(56) References Cited

U.S. PATENT DOCUMENTS 3,323,277 A * 6/1967 Hellriegel ......... B29C 66/91653 53/374.6
2002/0171179 A1* 11/2002 Dundas .................. B29C 49/58 264/525

FOREIGN PATENT DOCUMENTS

CN 213623258 * 7/2021

OTHER PUBLICATIONS

English language translation of CN 213623258.*

* cited by examiner

*Primary Examiner* — Larry W Thrower
(74) *Attorney, Agent, or Firm* — Olson & Cepuritis, Ltd.

(57) ABSTRACT

A gas shield generator positionable over open parisons in a Blow/Fill/Seal machine prior to container forming, filling and sealing minimizes likelihood of particulate contamination of open parisons while the open parisons are transported to a parison blowing and filling station.

3 Claims, 10 Drawing Sheets

GAS SHIELD GENERATOR FOR A BLOW/FILL/SEAL MACHINE

CROSS-REFERENCE TO RELATED APPLICATION

This application is a continuation-in-part of U.S. Ser. No. 18/195,183 filed on May 9, 2023, which is incorporated herein by reference in its entirety.

FIELD OF INVENTION

This invention relates to Blow/Fill/Seal technology and in particular to a protective gas shield for extruded parisons in a Blow/Fill/Seal machine.

BACKGROUND OF THE INVENTION

Blow/Fill/Seal ("B/F/S") technology is a preferred technology for aseptic packaging of pharmaceutical and health-care products. This packaging is a multi-step process of blow molding an extruded parison, forming a container, aseptically filling the formed container, and hermetically sealing the container in a single sequential operation in an automated machine. A thermoplastic material is heat extruded between mold parts, continuously in a tubular shape, through a circular throat to form a hanging tube referred to as a parison. When the extruded tube (parison) reaches a desired length, the mold closes around the parison and the parison is cut from the extruder. The bottom portion of the parison is pinched closed, and the top is held open and in place with a set of holding jaws that are part of a mold assembly. The closed mold containing the parison is then transferred to a forming, filling and sealing station by a mold carriage.

Cutting of the parison usually involves the use of a heated moving cutter such as a hot wire or hot knife which melts through and severs the parison. A potential disadvantage associated with the use of a hot wire or the like expedient is the risk inherent in the generation or creation of parison particulates or vapor during the severance process and the deposit thereof within the interior of the ultimately formed, filled and sealed container.

The present invention provides a device and method which greatly reduces the generation or creation of contaminant particulates during the Blow/Fill/Seal process.

SUMMARY OF THE INVENTION

A gas shield generator in a Blow/Fill/Seal machine provides a protective gaseous envelope over open ends of extruded parisons and minimizes likelihood of particulate contamination during transfer to a filling and sealing process for the parisons.

The gas shield generator for a Blow/Fill/Seal machine is adapted for attachment to a parison mold carriage of the Blow/Fill/Seal machine. The gas shield generator includes a base plate that carries a linear actuator which, by back-and-forth movement, positions a reciprocating, gas-emitting dispenser over open parisons held in the mold carriage. The gas-emitting dispenser can be a perforated plenum chamber, a bank of nozzles, a hood, and the like, in a gas flow communication with a protective gas source and which, in turn, is operably associated with the linear actuator. The gas-emitting dispenser is positioned over the open extruded parisons from a rest position by action of the linear actuator and withdrawn after the extruded parisons have been transported to a blowing and filling station.

Preferred protective gas is sterilized air or sterilized nitrogen. A preferred linear actuator is a pneumatic linear actuator.

DETAILED DESCRIPTION OF PREFERRED EMBODIMENTS

This invention may be used in many different forms. The specification and the accompanying drawings disclose only exemplary embodiments of the present invention. The invention is not to be limited to the embodiments illustrated, however.

The precise shapes and sizes of the components herein described are not essential to the invention unless otherwise indicated.

For ease of description, the apparatus and method of this invention will be described in the normal (upright) operating position. Terms such as upper, lower, top, bottom, horizontal, etc., will be used in reference to this position. It will be understood, however, that the apparatus of this invention may be manufactured, stored, transported, used, and sold in an orientation other than the position described.

Use of the apparatus and method of this invention incorporates some of the method steps and apparatus disclosed in U.S. Pat. No. 4,707,966 to Weiler et al. The disclosures therein are incorporated herein by reference to the extent that such disclosures are pertinent and not inconsistent with the present specification.

Figure 1:
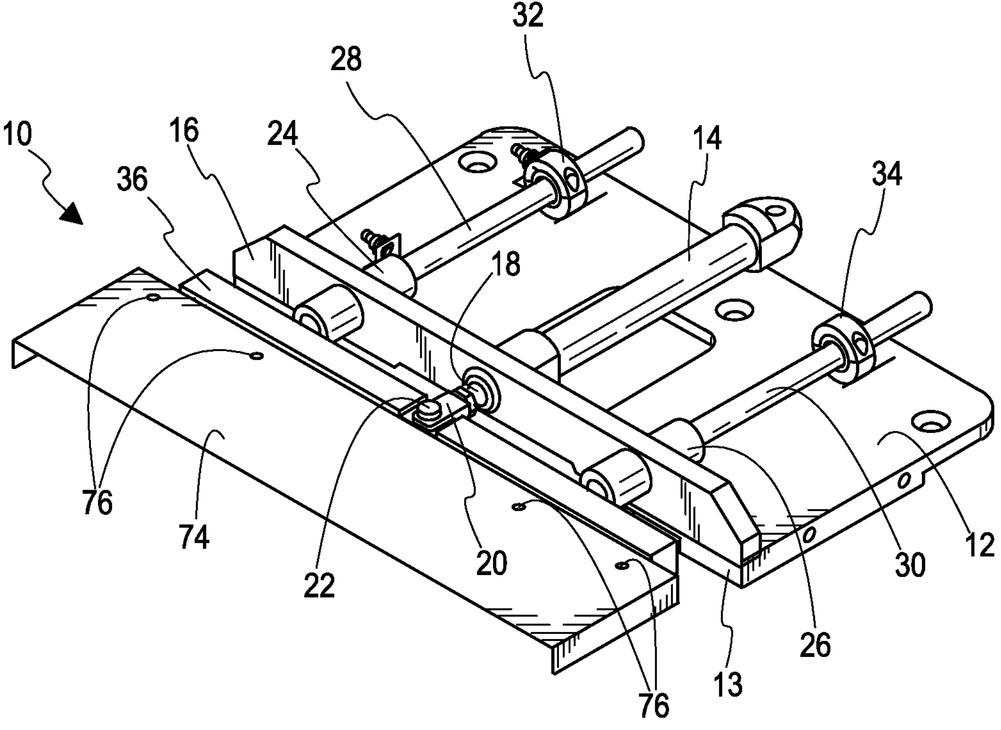
FIG. 1 is a perspective view of a gas shield generator embodying the present invention.
Figure 2:
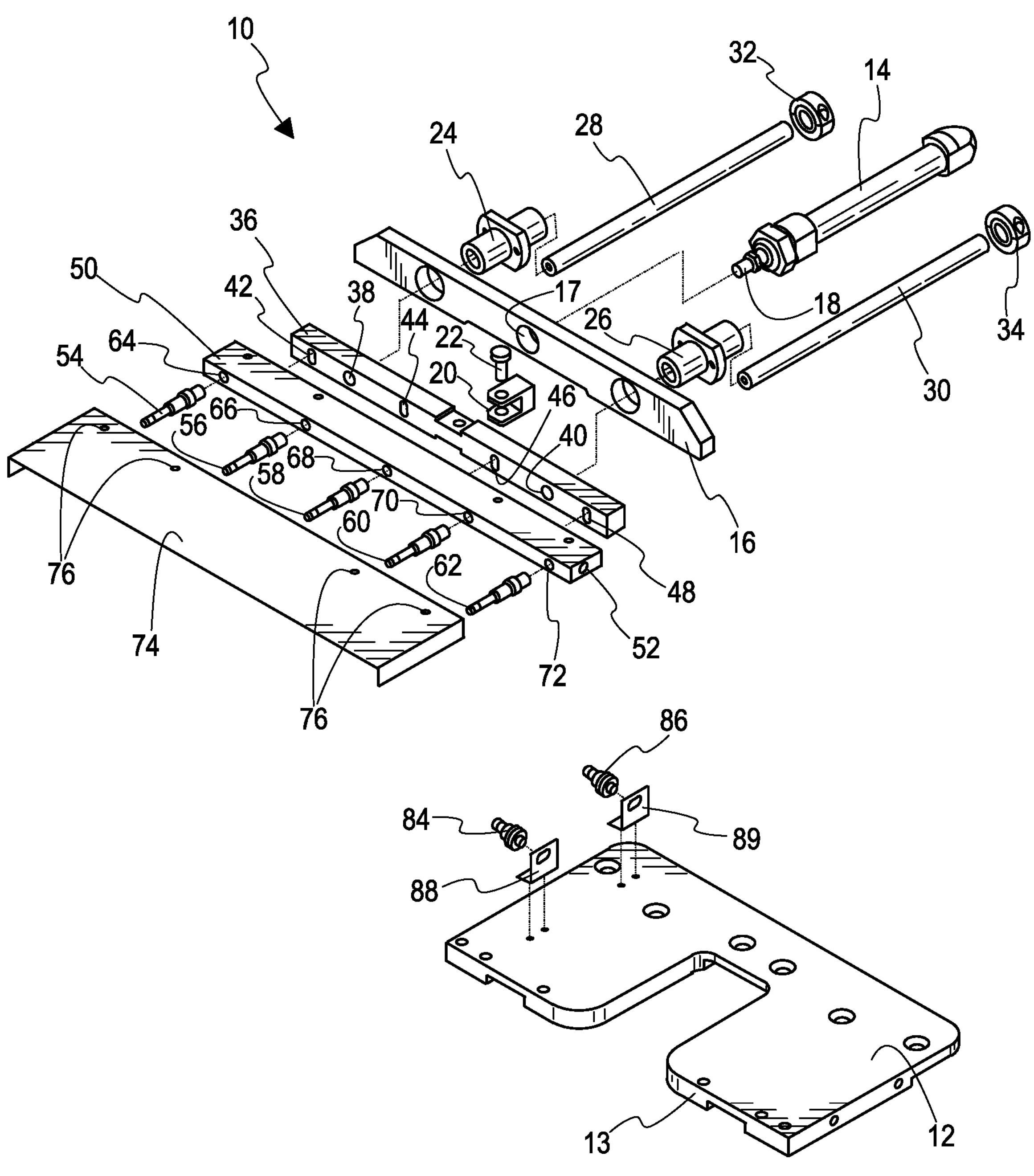
FIG. 2 is an exploded perspective view of the gas shield generator shown in FIG. 1.

Referring to FIGS. 1 and 2, gas shield generator 10 connected to a gas-emitting dispenser includes base plate 12 and elongated tie bar 16 attached thereto along leading edge 13 of base plate 12. Linear actuator 14, preferably a pneumatic linear actuator, is mounted to tie bar 16 so that a distal end portion 18 of a piston rod (not shown) in linear actuator 14 extends through aperture 17 (FIG. 2) beyond tie bar 16. A clevis fastener comprising clevis 20 and clevis pin 22 connects linear actuator 14 to manifold mounting bar 36 which, in turn, is connected to manifold 50 of a gas-emitting dispenser.

Center flange bearings 24 and 26 are mounted in tie bar 16 flanking aperture 17 and distal end portion 18 on both sides. Linear shafts 28 and 30 are mounted to base plate 12 by shaft collars 32 and 34. Linear shaft 28 is received in center flange bearing 24, extends therethrough, and a distal end portion of linear shaft 28 is received in bolt hole 38 of manifold mounting bar 36 and connected thereto. Likewise, linear shaft 30 is received in center flange bearing 26, extends therethrough, and a distal end portion of linear shaft 30 is received in bolt hole 40 of manifold mounting bar 36 and connected thereto. Linear shafts 28 and 30 are bolted with stainless steel socket head cap screws (not shown) to manifold mounting bar 36 via bolt holes 38 and 40 into taps at the ends of linear shafts 28 and 30. Linear shafts 28 and 30 stabilize the back-and-forth movement of manifold mounting bar 36 by the back-and-forth action of linear actuator 14.

A gas-emitting dispenser connected to liner actuator 14 includes hollow gas manifold 50 which supplies protective sterilized gas to gas dispensing nozzles 54, 56, 58, 60 and 62 mounted to manifold mounting bar 36 by fasteners that extend from oblong apertures 42, 44, 46 and 48. Gas manifold 50 has tapped holes on the rear surface against manifold mounting bar 36. Oblong apertures 42, 44, 46 and 48 are slotted counterbored holes used to bolt together manifold mounting bar 36 and gas manifold 50 with stainless steel socket head cap screws (not shown). Gas inlet 52 in manifold 50 provides a connection to a protective gas source such as sterilized air or sterilized nitrogen. For some applications, a protective gas such as air filtered by a high efficiency particulate air (HEPA) filter may be adequate.

Gas dispensing nozzles 54, 56, 58, 60 and 62 extend from respective sockets 64, 66, 68, 70 and 72 provided in hollow gas manifold 50 having a protective gas inlet 52, and are in operable gas flow communication with manifold 50 and a protective gas supply to manifold 50. The number of gas nozzles can vary. Preferably, a gas nozzle is provided for each parison received in a main mold of a Blow/Fill/Seal machine. Gas shield cover 74, also carried by manifold 50, extends over gas nozzles 54, 56, 58, 60 and 62. Gas shield cover 74 can be opaque or transparent, as desired, and is secured to manifold 50 by fasteners 76.

Optional proximity sensors such as proximity sensor 84 in mounting bracket 88 and proximity sensor 86 in mounting bracket 89 can be provided on base plate 12 for monitoring the movement of gas shield generator 10.

In use, manifold 50 together with the gas dispensing nozzles and gas shield cover 74 are positioned over open parison tops until the parisons are transported to a forming, filling and sealing station in the Blow/Fill/Seal machine.

Figure 3:
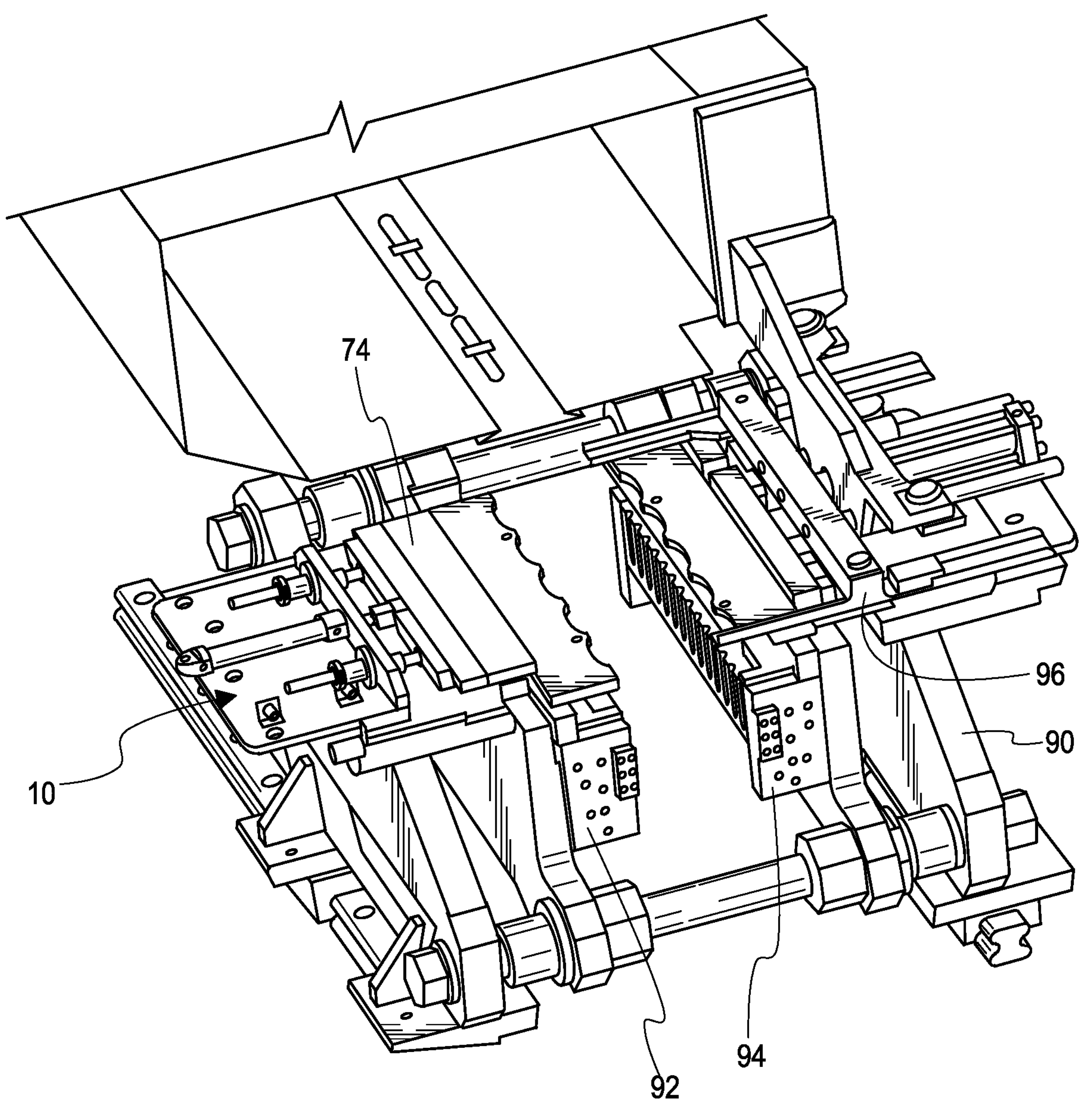
FIG. 3 is a perspective view of the gas shield generator of FIG. 1 mounted to a mold carriage shown with open main mold parts.
Figure 4:
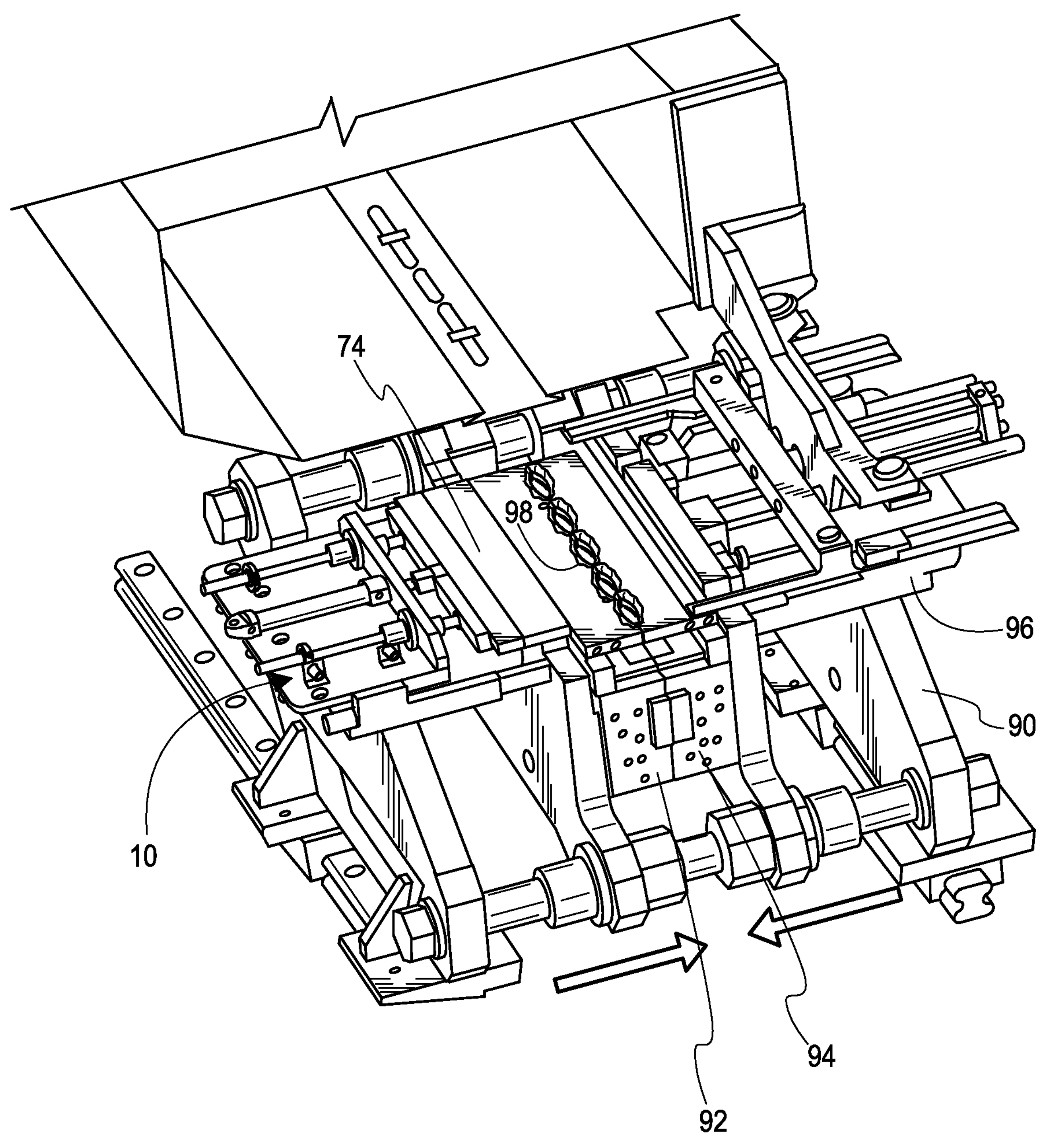
FIG. 4 is a perspective view of the gas shield generator of FIG. 1 mounted to a mold carriage shown with main mold parts closed around parisons.
Figure 5:
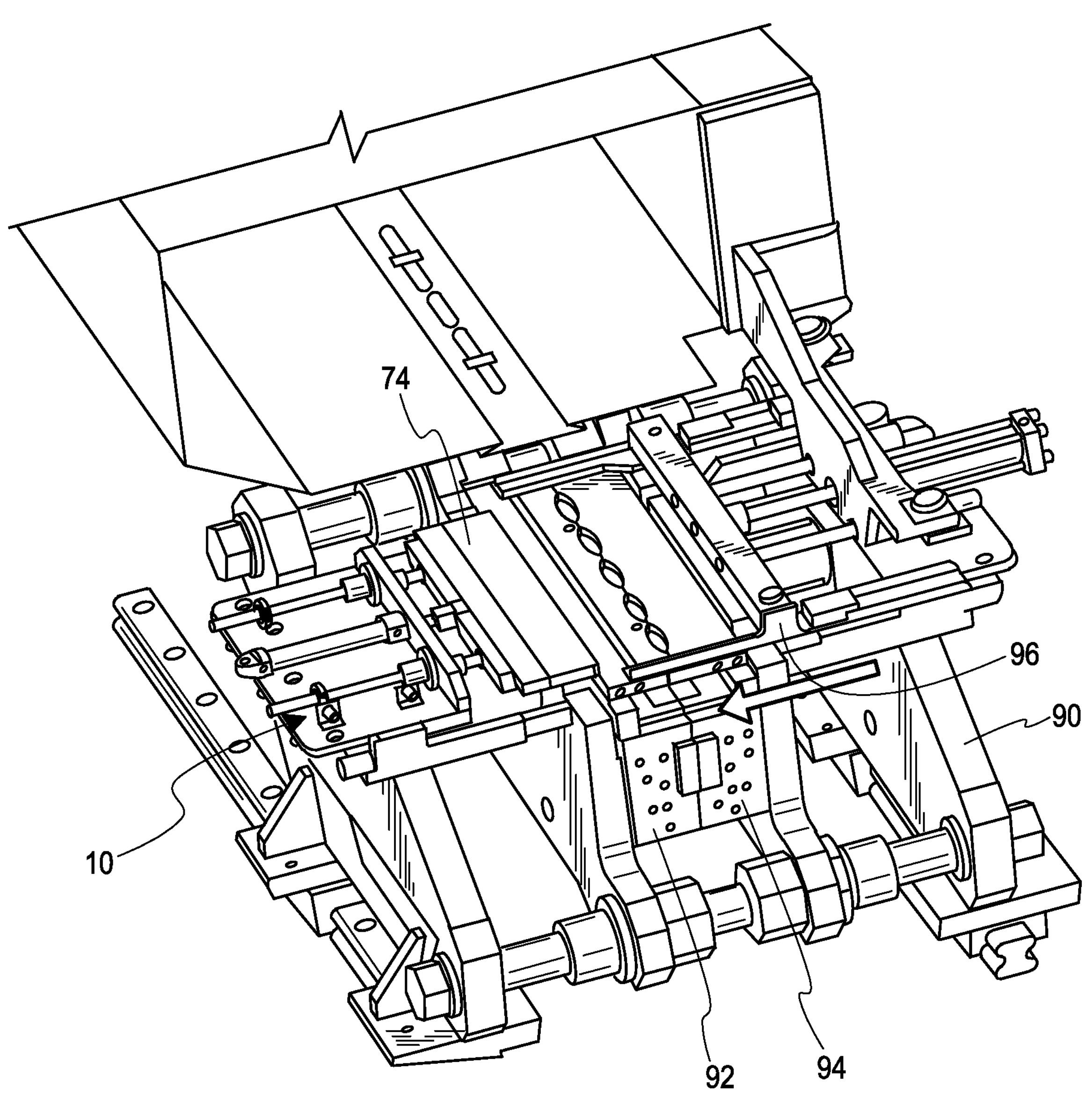
FIG. 5 is a perspective view of the gas shield generator of FIG. 1 mounted to a mold carriage shown with main mold parts closed around parisons, and a hot wire assembly extended past the parisons.
Figure 6:
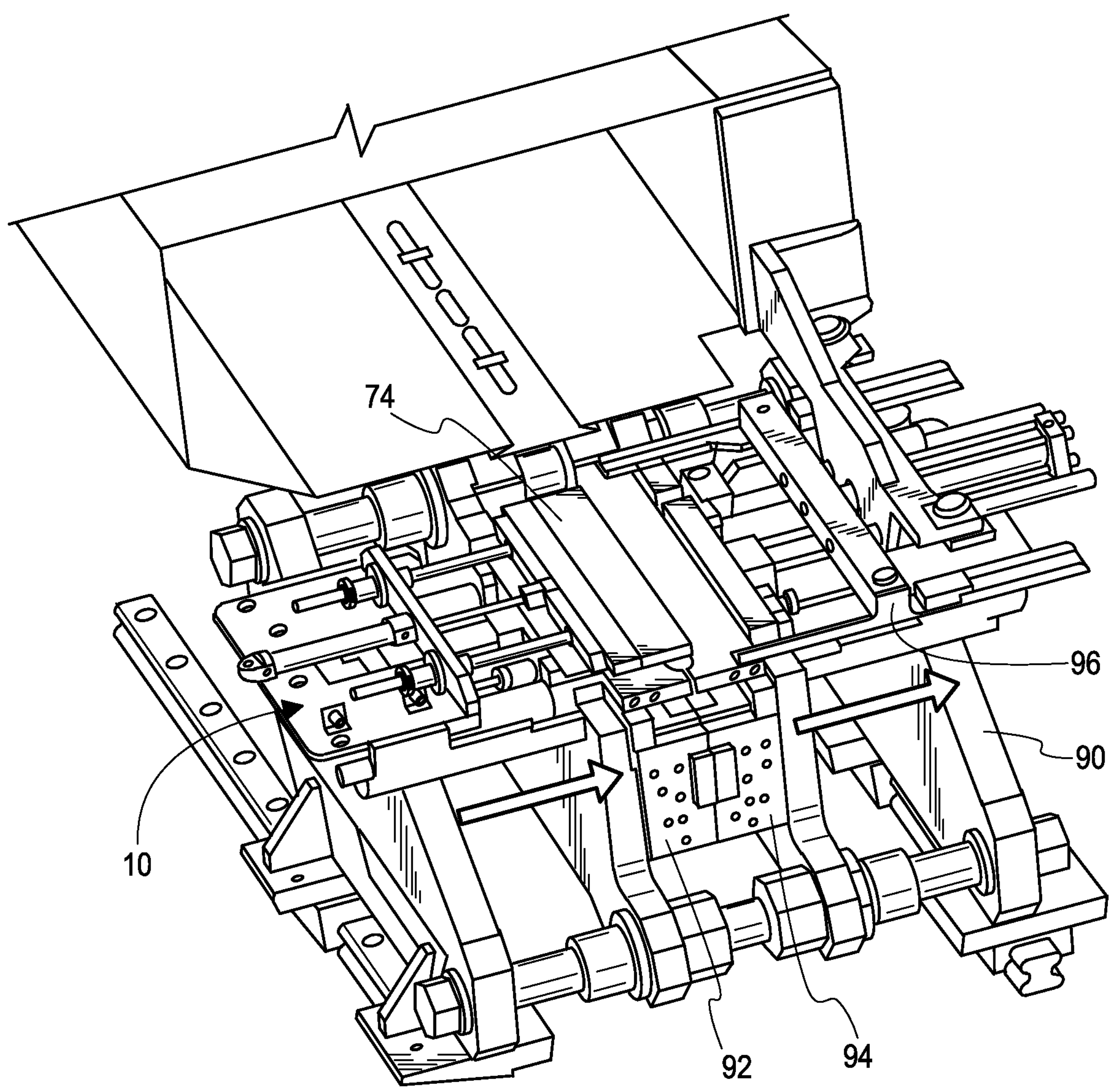
FIG. 6 is a perspective view of the gas shield generator of FIG. 1 mounted to a mold carriage shown with main mold parts closed, hot wire assembly retracted, and the gas shield generator positioned over open parisons.
Figure 7:
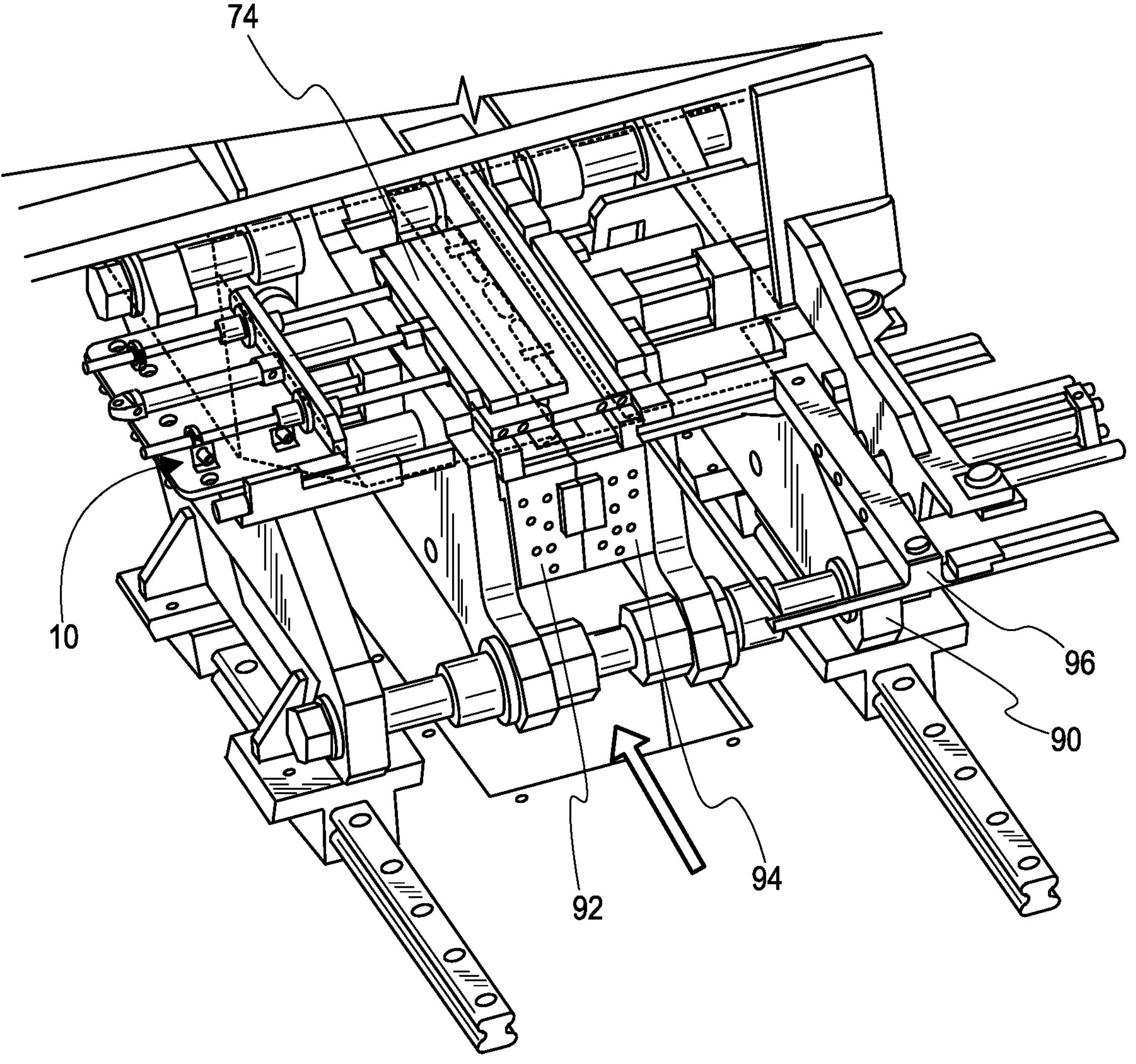
FIG. 7 is a perspective view of the gas shield generator of FIG. 1 mounted to a mold carriage shown with main mold closed and the gas shield generator positioned over open parisons while the mold carriage with open parisons is en route to a container forming, filling and sealing station.

FIG. 3 shows gas shield generator 10 mounted to mold carriage 90 of a Blow/Fill/Seal machine. Main mold parts 92 and 94 on mold carriage 90 are open and ready to receive parisons. FIG. 4 shows mold parts 92 and 94 closed around parison portions 98 that extend above closed mold parts 92 and 94. Closing of mold parts 92 and 94 seals a bottom portion of each parison. Parisons are held in place via mold holding jaws (not shown). Next, as shown in FIG. 5, hot knife assembly 96, mounted on mold carriage 90 opposite gas shield generator 10 is extended over closed mold parts 92 and 94, and parison portions are cut from the extruder of a Blow/Fill/Seal machine (not shown) while resulting individual open parison tops are held open by mold holding jaws (not shown). Thereafter, as shown in FIG. 6, hot knife assembly 96 is retracted, and the gas-emitting dispenser of the gas shield generator 10 is extended over the open top portions of extruded parisons so that gas shield cover 74 is positioned directly over the open parison tops. Gas nozzles such as nozzles 54, 56, 58, 60 and 62 supply protective gas into and around the open parison tops. Optionally, the protective gas can be a hot protective gas. In this manner, a gas shield, or curtain, provides a clean environment within each parison as the parisons with open tops are transported to a filling station as illustrated in FIG. 7. Gas shield cover 74 remains in position over open parison tops until a blowing and filling station is reached, at which time gas shield generator 10 is retracted to initial rest position by linear actuator 14 as shown in FIG. 3.

Another version of the gas shield generator embodying the present invention is illustrated in FIGS. 8-11.

Figure 8:
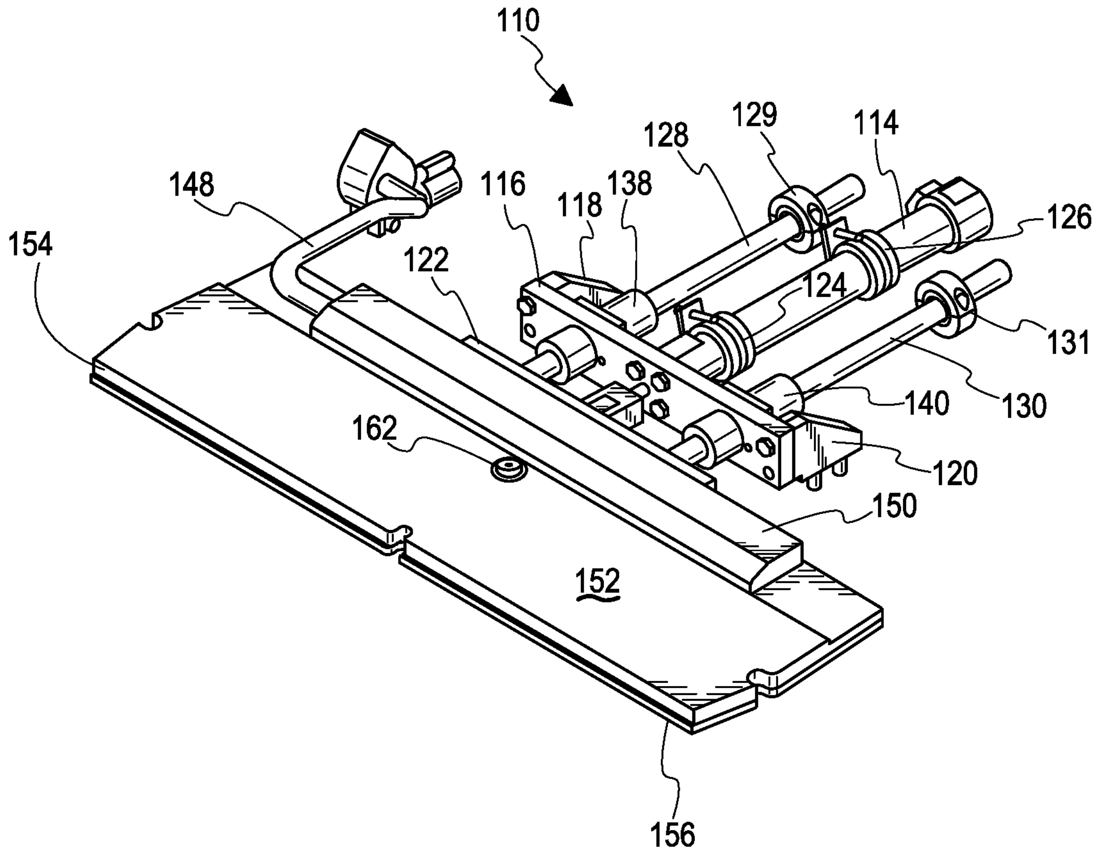
FIG. 8 is perspective view of an alternate gas shield generator embodying the present invention and having a perforated plenum chamber.
Figure 9:
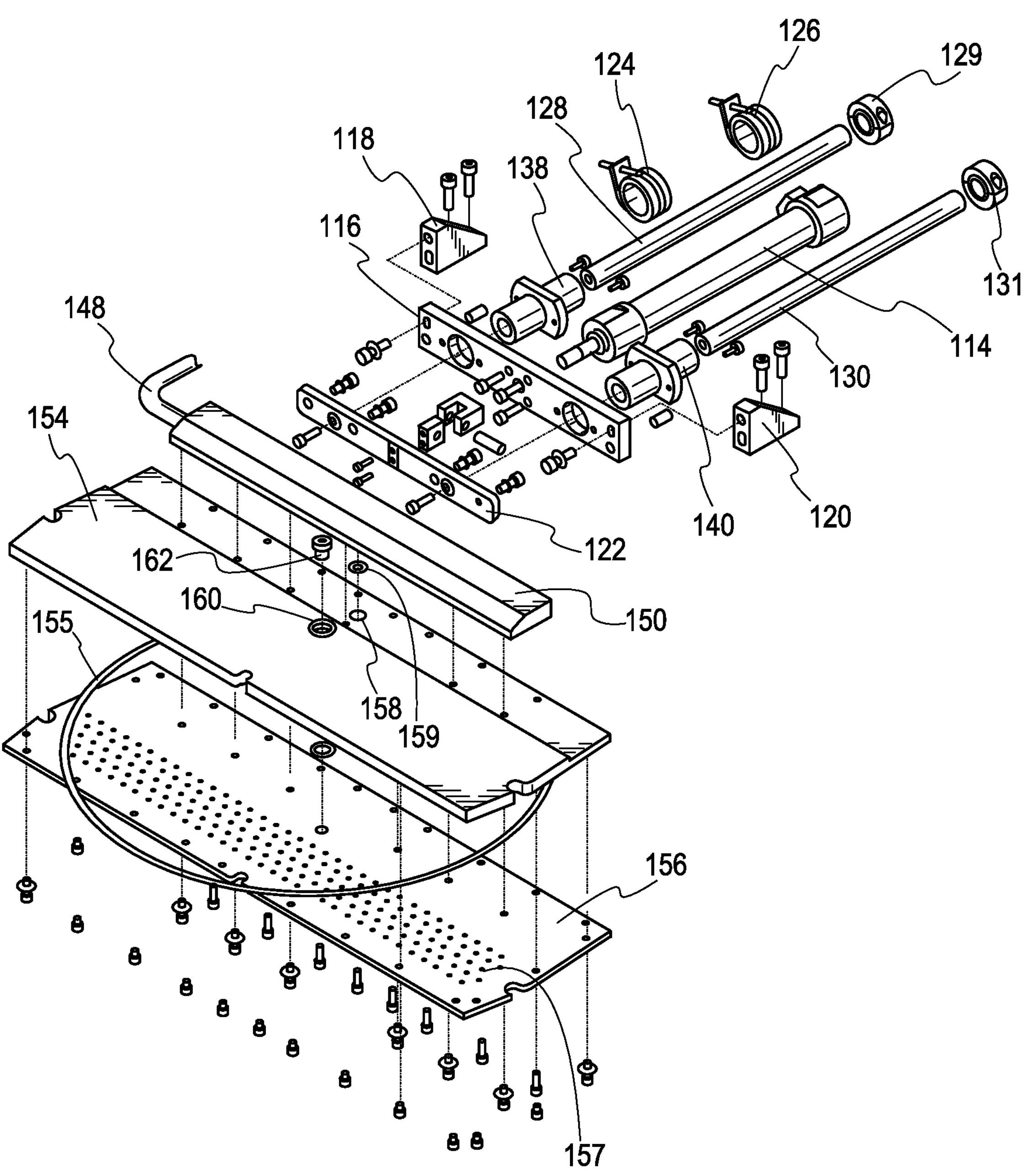
FIG. 9 is an exploded perspective view of the gas shield generator shown in FIG. 8.

As shown in FIGS. 8 and 9, gas shield generator 110 includes linear actuator 114, equipped with optional proximity sensors 124 and 126 mounted to elongated tie bar 116 in a manner similar to linear actuator 14 shown in FIGS. 1 and 2. Linear actuator 114 preferably is a pneumatic linear actuator. Mount gussets 118 and 120 at opposite ends of elongated tie bar 116 secure linear actuator 114 to a base plate (not shown) similar to base plate 12 shown in FIG. 1.

Linear shafts 128 and 130, held in place by linear shaft collars 129 and 131, respectively, are received in respective flange bearings 138 and 140 mounted in elongated tie bar 116. Distal end portions of linear shafts 128, 130 are joined to mounting bar 122. Linear shafts 128, 130 stabilize the back-and-forth movement of hollow gas distribution unit 150 provided by linear actuator 114. Optional proximity sensors 124 and 126 monitor the movement of gas shield generator 110.

Hollow gas distributor bar 150 is part of the gas-emitting dispenser, is in fluid flow communication with, and is mounted to, planar plenum chamber 152 which distributes a protective gas envelope over open parisons. Plenum chamber 152 is defined by hollowed out top plate 154 and perforated bottom plate 156 coextensive with top plate 154 and attached thereto. O-ring 155 (FIG. 9) provides a gas seal between top plate 154 and perforated bottom plate 156. Plenum chamber 152 receives protective shielding gas under pressure from hollow gas distribution bar 150 via inlet aperture 158 (FIG. 9) in top plate 154. Gas distribution bar 150, in turn, is operably connected to a pressurized protective gas source (not shown) by conduit 148.

Figures 10, 11:
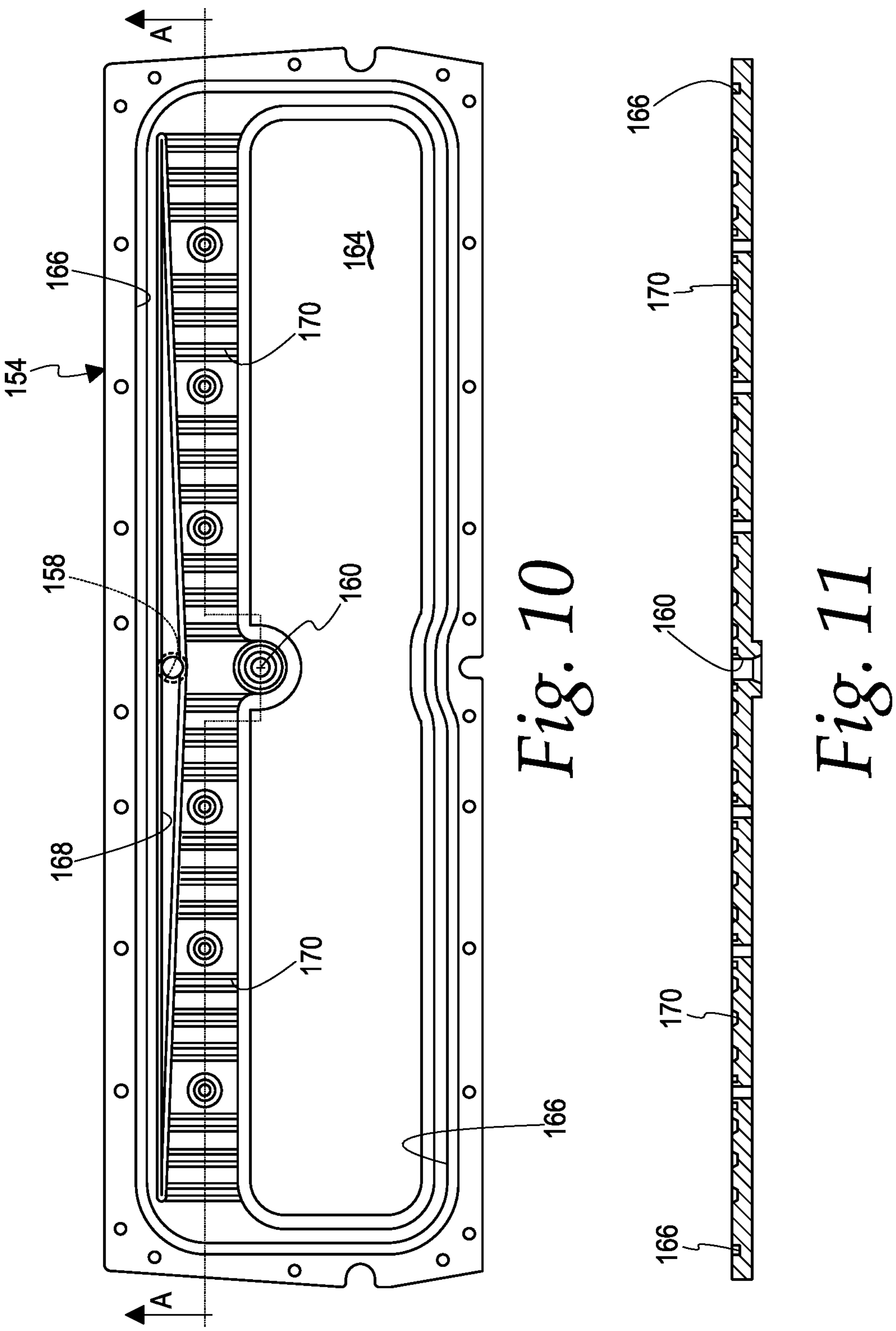
FIG. 10 is a plan view of the hollowed out interior of the plenum chamber in the gas shield generator shown in FIG. 8.
FIG. 11 is a sectional view of FIG. 10 taken along plane A-A.

As shown in FIGS. 9-11, top plate 154 is also provided with a clearance aperture 160, normally closed by plug 162, for introducing a sterilizing medium such as steam and the like in plenum chamber 152.

The contour of the upper portion of plenum chamber 152 is defined by the hollowed out portion of top plate 154. An illustrative embodiment is shown in FIGS. 10 and 11. Seat 166 for O-ring 155 (FIG. 9) circumscribes open inner space 164 in top plate 154. Gas supply passageway 168 in top plate 154 is in fluid flow communication with gas inlet aperture 158, extends along one side of open inner space 164 and serves to distribute incoming protective gas over perforated bottom plate 156 by means of plural gas channels or grooves

170 in top plate 154. Protective shielding gas introduced into inner space 164 exits therefrom via perforations 157 in bottom plate 156 when gas shield generator 110 is positioned over open ends of extruded parisons by action of linear actuator 114.

In use gas shield generator 110 is positioned over the open top portions of extruded parisons in substantially the same manner as illustrated in FIGS. 3-7 for gas shield generator 10.

The foregoing description and drawings are illustrative embodiments of the invention, but are not to be taken as limiting. Still other variants within the spirit and scope of this invention are possible and will readily present themselves to those skilled in the art.

The invention claimed is:

1. A gas shield generator for a Blow/Fill/Seal machine which comprises a base plate adapted for attachment to a parison mold carriage;

a linear actuator carried by the base plate;

a hollow gas distribution bar operably associated with the linear actuator for back-and-forth movement and defining a gas inlet and a gas outlet; and a planar plenum chamber mounted to the gas distribution bar and in gas flow communication therewith;

said planar plenum chamber comprising a hollowed out top plate and a perforated bottom plate coextensive with the top plate; and wherein the hollowed out top plate defines an open space, a gas supply passageway, and plural channels in fluid flow communication with the open space and the gas supply passageway.

2. The gas shield generator in accordance with claim 1 operably mounted to a mold carriage of a Blow/Fill/Seal machine.

3. The gas shield generator in accordance with claim 1 wherein the linear actuator is a pneumatic linear actuator.

* * * * *